US009465881B2

(12) United States Patent
M. et al.

(10) Patent No.: US 9,465,881 B2
(45) Date of Patent: Oct. 11, 2016

(54) USER DISPLAYS USING N-WAY PAGINATED MERGE OF INFORMATION FROM DIVERSE SOURCES

(71) Applicant: Yahoo! Inc., Sunnyvale, CA (US)

(72) Inventors: Chandrashekar M., Bangalore (IN); Ganesh Jothikumar, Bangalore (IN); Krishnaprasad Shivdasan, Bangalore (IN)

(73) Assignee: Yahoo! Inc., Sunnyvale, CA (US)

(*) Notice: Subject to any disclaimer, the term of this patent is extended or adjusted under 35 U.S.C. 154(b) by 315 days.

(21) Appl. No.: 13/664,719

(22) Filed: Oct. 31, 2012

(65) Prior Publication Data

US 2014/0123001 A1    May 1, 2014

(51) Int. Cl.
| | | |
|---|---|---|
| G06F 17/00 | (2006.01) | |
| G06F 17/30 | (2006.01) | |
| G06F 17/21 | (2006.01) | |
| G06F 3/0483 | (2013.01) | |
| G06F 3/0488 | (2013.01) | |

(52) U.S. Cl.
CPC ....... *G06F 17/30893* (2013.01); *G06F 3/0483* (2013.01); *G06F 3/04883* (2013.01); *G06F 17/217* (2013.01)

(58) Field of Classification Search
CPC ...................................................... G06F 17/21
USPC ........................................................ 715/251
See application file for complete search history.

(56) References Cited

U.S. PATENT DOCUMENTS

| 4,514,826 A | * | 4/1985 | Iwata et al. | |
| 8,832,086 B1 | * | 9/2014 | Zhang et al. | ................. 707/723 |
| 2009/0150769 A1 | * | 6/2009 | Konnola et al. | .............. 715/251 |

* cited by examiner

*Primary Examiner* — Peiyong Weng
(74) *Attorney, Agent, or Firm* — Mauriel Kapouytian Woods LLP; Lana Akopyan; James Woods

(57) ABSTRACT

Identifying a set of information sources from a plurality of N diverse information sources, then, responsive to user input, retrieving a first set of data items from a first information source after determining a first extent of information retrieval, and retrieving a second set of data items from the second information source after determining a second extent of information retrieval and so on for all of the N diverse information sources. The extents of the retrieval comprise at most a number of data items specified by a user (e.g., corresponding to a page size). The method continues by sorting all of the N set of data items fetched from the diverse sources in Round Robin fashion until at least a specific number of elements are merged for generating a paged, sorted set of data items to be displayed in a paginated format.

20 Claims, 9 Drawing Sheets

USER DISPLAYS USING N-WAY PAGINATED MERGE OF INFORMATION FROM DIVERSE SOURCES

FIELD

The present disclosure is directed towards high-performance rendering of displays using N-way paginated merging of information from diverse sources.

BACKGROUND

In certain environments, users need to access huge amounts of information from multiple different sources, and then be able to analyze the information using one or more forms of a sorted list presented in a paginated display. What's more, the information from multiple different sources may need to be filtered and/or formatted before being presented to the requestor. In some circumstances, one or more of the multiple different sources may comprise streaming information.

Legacy techniques rely on accessing the multiple sources with foreknowledge of the extent of the data, and/or with foreknowledge of the persistence of the source information. Unfortunately, certain modern sources (e.g., live feeds) may be of indeterminate length, and worse, certain sources (e.g., streaming sources) may be accessible at one moment in time, and inaccessible at another moment in time, and then again accessible at a third moment in time. Still worse, legacy techniques access, sort, merge, and present such information from multiple sources even if the information might not be needed by the user. These legacy techniques often result in wasteful consumption of computing resources.

What are needed are high-performance techniques for accessing and managing iterative accesses to information to be sorted, paginated, and presented on user displays.

SUMMARY

The present disclosure provides an improved method, system, and computer program product suited to address the aforementioned issues with legacy approaches. More specifically, the present disclosure provides a detailed description of techniques used in methods, systems, and computer program products for high-performance rendering of displays using N-way paginated merging of information from diverse sources.

Disclosed herein are methods, systems, and computer program product embodiments for high-performance rendering of displays using N-way paginated merging of information from diverse information sources. The method commences identifying a set of information sources from a plurality of diverse information sources, then is responsive to user input for retrieving a first set of data items from a first information source after determining a first extent of information retrieval, and retrieving a second set of data items from the second information source after determining a second extent of information retrieval. The extents of the retrieval are such that the retrieved items comprise at most a number of data items specified by a user (e.g., corresponding to a page size). This calculated extent serves to limit the extent of information retrieved in any iteration, thus using computing resources extremely efficiently. The method continues by sorting the first set of data items together with the second set of data items to generate an amalgamated sorted set of data items for display in a paginated format. A user can page to a next, or previous, or first, or last page, and yet, using the techniques disclosed herein, only the needed amount of information is retrieved in any iteration.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

Specific embodiments and features are set forth in the appended claims. However, for purpose of explanation, several exemplary embodiments are set forth in the following figures. Like reference characters refer to corresponding parts throughout the drawings.

DETAILED DESCRIPTION

Figure 1:
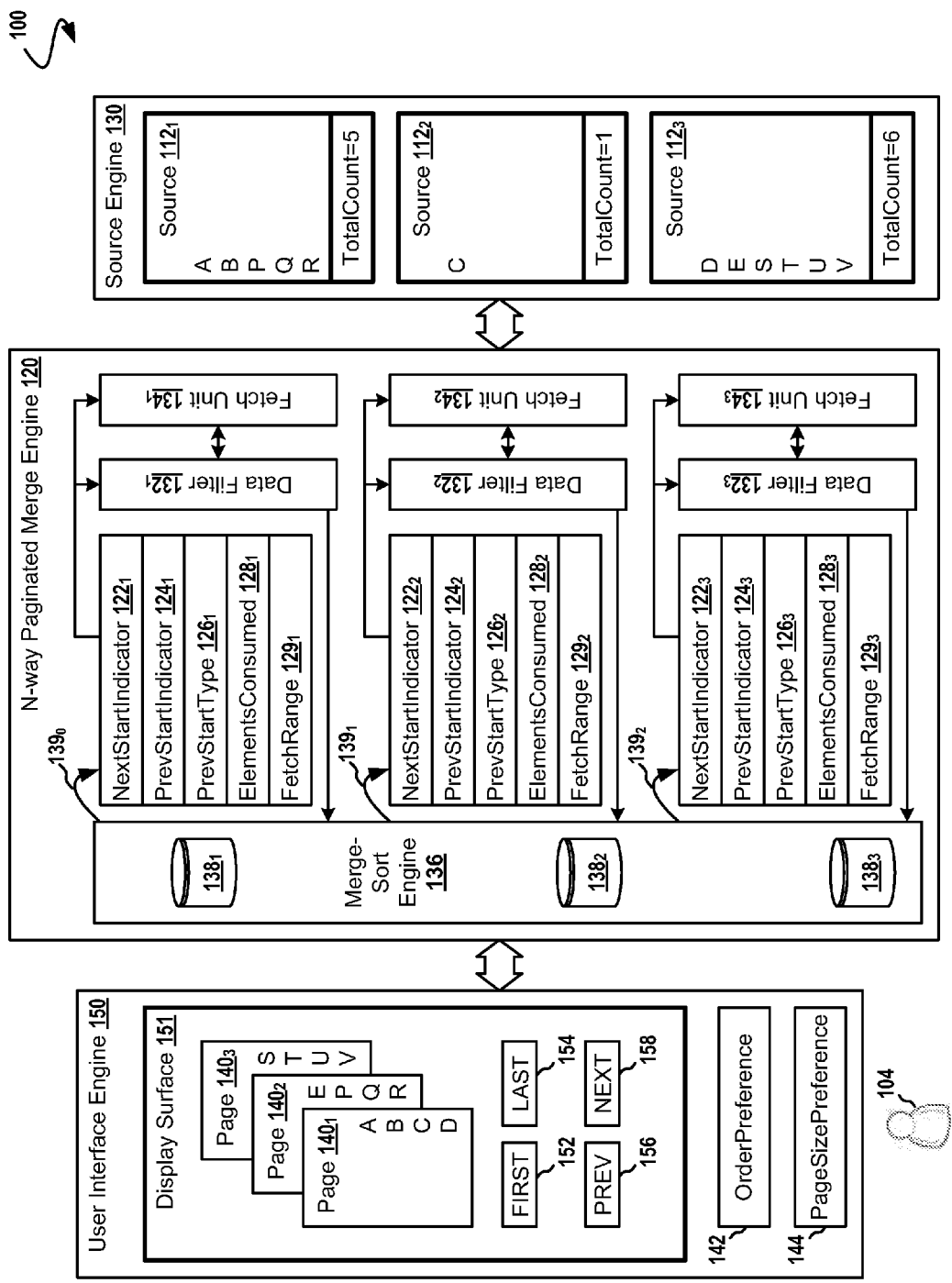
FIG. 1 depicts an environment for high-performance rendering of displays using N-way paginated merging of information from diverse sources, according to some embodiments.

Reference will now be made to various embodiments, some examples of which are illustrated in the accompanying drawings.

Overview

Disclosed herein are algorithms to achieve pagination with filtering and sorting across multiple sources. One such algorithm provides an optimal mechanism to store the state of each source participating in the paginated view. The various sources contribute only a selected portion of their information extent to a particular paginated view in the user interface, and the state representing the most recent retrieval is based at least partially on how much contribution had already been retrieved. This form of access and state manipulation is performed similarly for each accessed source. Only a small amount of state information need be stored at any moment in time (e.g., a moment in time can be defined as that moment when a current view in the user interface is displayed).

Having such state information for each participating source facilitates techniques to retrieve a next portion of information from each corresponding source, however the next portion need not be accessed until a user makes a request for more information, the extent of which requests overlaps with yet unretrieved information.

Some high-performance aspects of these techniques stem from algorithmic implementation where only a limited extent of new information is retrieved based on a user interface request or gesture. In exemplary cases, the aforementioned limited extent can be bounded by calculating a number of records to be retrieved from each source, such that calculated number is determined by the extent of access needed (or anticipated) to fulfill the requested page view.

Accessing, retrieving, filtering, formatting, sorting, merging, and displaying only the portion needed for the next user interface display results in a significant reduction of computing resources used.

Reference will now be made in further detail to various embodiments, some examples of which are illustrated in the accompanying drawings. It will be understood that the described embodiments are not intended to limit the scope of the claims. On the contrary, the embodiments are intended to cover alternatives, modifications and equivalents, which may be included within the scope of the appended claims. Furthermore, in the following detailed descriptions, numerous specific details are set forth in order to provide a thorough understanding of the exemplary embodiments. However, one of ordinary skill in the art can recognize that the present advances may be practiced without these specific details. In other instances, well known methods, procedures, components, and circuits have not been described in detail so as avoid unnecessarily obscuring aspects of the described embodiments.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood, at least in part, from usage in context. For example, terms such as "and", "or", or "and/or" as used herein may include a variety of meanings that may depend at least in part upon the context in which such terms are used. Typically, the term "or" if used to associate a list (for example, a list such as A, B or C), is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the" may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, depending at least in part on context.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc. as may be used herein is generally conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and/or otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions using terms such as "processing" or "computing" or "communicating" or "instantiating" or "registering" or "selecting" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission, or display devices.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Section I

General Terms

Some of the terms used in this description are defined below (in alphabetical order) for easy reference. These terms are not rigidly restricted to these definitions. A term may be further defined by the term's use in other sections of this description.

"Ad" (e.g., ad, item and/or message) means a paid announcement, as of goods or services for sale, preferably on a network such as the internet. An ad may also be referred to as an item and/or a message.

An "Ad server" or "Advertising server" comprises a server that stores online advertisements for presentation to users. The act of ad serving refers to methods used to place online advertisements on websites, in applications, or other places where users are more likely to see them such as during an online session or during computing platform use, for example. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

"Advertiser" (e.g., messenger and/or messaging customer, etc.) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Ad targeting" or "targeting" refers to web portals like Yahoo!, where advertisements may be displayed on web pages resulting from a user-defined search based at least in part upon one or more search terms. Advertising may be beneficial to users, advertisers, or web portals if displayed advertisements are relevant to interests of one or more users. Thus, a variety of techniques have been developed to infer user interest, user intent, or to subsequently target relevant advertising to users. One approach to presenting targeted advertisements includes employing demographic characteristics (e.g., age, income, sex, occupation, etc.) for predicting user behavior, such as by a group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

"Click" (e.g., ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

A "Computing device" means a computing device that may be capable of sending or receiving signals such as via a wired or wireless network, or may be capable of processing or storing signals such as in memory as physical memory states, and may, therefore, operate as a server. Thus, devices capable of operating as a server may include, as examples, dedicated rack-mounted servers, desktop computers, laptop computers, set top boxes, integrated devices combining various features such as two or more features of the foregoing devices, or the like.

A "Content server" is a server that may include a device that includes a configuration to provide content via a network to another device. A content server may, for example, host a site such as a social networking site, examples of which may include, without limitation, Flicker, Twitter, Facebook, LinkedIn, or a personal user site (such as a blog, vlog, online dating site, etc.). A content server may also host a variety of other sites, including, but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals such as electrical signals, for example, or may be stored in memory as physical states, for example.

Examples of devices that may operate as a content server include desktop computers, multiprocessor systems, microprocessor-type or programmable consumer electronics, etc.

"Conversion" (e.g., ad conversion) means a purchase of a product/service that happens as a result of a user responding to an ad and/or a coupon.

"Database" (e.g., database system, etc.) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Diverse sources" means information sources that differ in at least one aspect of format of content, source location, or retrieval method. A first single source can be considered as a diverse source with respect to a second single source, so long as they first single source is distinct from the second single source.

"Impression" (e.g., ad impression) means a delivery of an ad to a user device for viewing by a user.

The "Internet" or "internet" refers to a decentralized global network of networks. The internet includes local area networks (LANs), wide area networks (WANs), wireless networks, or long haul public networks that, for example, allow signal packets to be communicated between LANs. Signal packets may be communicated between nodes of a network such as, for example, to one or more sites employing a local network address. A signal packet may, for example, be communicated over the internet from a user site via an access node coupled to the internet. Likewise, a signal packet may be forwarded via network nodes to a target site coupled to the network via a network access node, for example. A signal packet communicated via the internet may, for example, be routed via a path of gateways, servers, etc. that may route the signal packet in accordance with a target address and the availability of a network path to the target address.

"Item" means an ad, which is defined above.

"Marketplace" means a world of commercial activity where products and/or services are browsed, bought and/or sold, etc. A marketplace may be located over a network such as the internet. A marketplace may also be located in a physical environment such as a shopping mall.

"Message" means an ad, which is defined above.

"Messaging" means advertising, which is defined above.

"Messenger" means an advertiser, which is defined above.

Some models may include guaranteed delivery advertising in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example. A process of buying or selling online advertisements may involve a number of different entities including advertisers, publishers, agencies, networks, or developers. "Ad networks" refers to an aggregation of ad space supply from publishers such as for provision en masse to advertisers.

"Network" means a connection, between any two or more computers, that permits the transmission of data. A network may be any combination of networks including, without limitation, the internet, a local area network, a wide area network, a wireless network, and/or a cellular network.

A "Network" means a network that may couple devices so that communications may be exchanged such as between a server and a client device or other types of devices, including between wireless devices coupled via a wireless network, for example. A network may also include mass storage such as network attached storage (NAS), a storage area network (SAN), or other forms of computer or machine readable media, for example. A network may include the internet, one or more local area networks (LANs), one or more wide area networks (WANs), wire-line type connections, wireless type connections, or any combination thereof. Likewise, sub-networks such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines such as a twisted wire pair, a coaxial cable, full or fractional digital lines including T1, T2, T3, or T4 type lines, integrated services digital networks (ISDNs), digital subscriber lines (DSLs), wireless links including satellite links, or other communication links or channels such as may be known to those skilled in the art. Furthermore, a computing device or other related electronic devices may be remotely coupled to a network such as via a telephone line or link, for example.

A wireless network may couple client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including long term evolution (LTE), WLAN, wireless router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies such as global system for mobile communication (GSM), universal mobile telecommunications system (UMTS), general packet radio services (GPRS), enhanced data GSM environment (EDGE), 3GPP long term evolution (LTE), LTE advanced, wideband code division multiple access (WCDMA), Bluetooth, 802.11b/g/n, or the like. A wireless network may include virtually any type of wireless communication mechanism by which signals may be communicated between devices such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the internet protocol (IP) may include IPv4 or IPv6.

A "peer-to-peer network" or "P2P network" may employ computing power or bandwidth of network participants in contrast with a network that may employ dedicated devices such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

"Publisher" means an entity that publishes, on a network, a web page having content and/or ads, etc. and/or publishes, on a network, a downloadable application and/or other digital context having digital content and/or digital ads, etc.

"Round Robin" or "Round Robin fashion" refers to successively selecting a next item from a group of items, the selection iteratively proceeding from the first item of the group to the last item of the group, then returning to again selecting the first item in the group. In some implementations, a module for performing such iterations (e.g., proceeding from the first item of the group to the last item of the group) is termed a commutator.

"Server" means a software application that provides services to other computer programs (and their users) on the same computer or on another computer or computers. A server may also refer to the physical computer that has been set aside to run a specific server application. For example, when the software Apache HTTP server is used as the web server for a company's website, the computer running Apache may also be called the web server. Server applications may be divided among server computers over an extreme range, depending upon the workload. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems such as Windows Server, Mac OS X, Unix, Linux, FreeBSD, or the like.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++, and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g., consumer, etc.) means an operator of a user device. A user is typically a person who seeks to acquire a product and/or service. For example, a user may be a person who is browsing Yahoo!™ Shopping for a new cell phone to replace their current cell phone. The term "user" may also refer to a user device, depending on the context.

"User device" (e.g., computer, user computer, client and/or server, etc.) means a single computer or a network of interacting computers. A user device is a computer that a user may use to communicate with other devices over a network such as the internet. A user device is a combination of a hardware system, a software operating system, and perhaps one or more software application programs. Examples of a user device include, without limitation, a laptop computer, a palmtop computer, a smartphone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both from web pages on websites. Examples of a web browser include, without limitation, Mozilla Firefox™ and Microsoft Internet Explorer™.

"Web page" means documents written in a mark-up language including, without limitation, HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web server" is a server configured for serving at least one web page to a web browser. An example of a web server is a Yahoo!™ web server. A server is defined above.

"Website" means one or more web pages. A website preferably includes a plurality of web pages virtually connected by links or URL addresses to form a coherent group.

Section II

Descriptions of the Figures

FIG. 1 depicts an environment 100 for high-performance rendering of displays using N-way paginated merging of information from diverse sources. As an option, the present environment 100 may be implemented in the context of the architecture and functionality of the embodiments described herein. Of course, however, the environment 100 or any operation therein may be carried out in any desired environment.

As shown, environment 100 includes a user 104 to operate a user interface (e.g., user interface engine 150), which in turn includes a display surface 151 capable of displaying information arranged in pages (e.g., page $140_1$, page $140_2$, page $140_3$, etc.). The user interface may comprise a user interface device such as a pointing or touch device (e.g., a mouse, a multi-touch screen, keyboard, etc.) for receiving indications or gestures or keystrokes from the user, and forwarding such occurrences to the user interface. For example, a user might use a pointing or touch device to indicate a user command such as depressing a button (e.g., first page button 152, last page button 154, previous page button 156, next page button 158, etc.). Further, the user interface may comprise a pointing or touch device, or other device (e.g., a keyboard, etc.) for receiving indications of values from the user. For example, a user might want to view information arranged in pages where the pages are populated in accordance with a particular user preference (e.g., order preference 142). Or, for example, a user might want to view information arranged in pages where the pages are populated to some maximum size in accordance with a particular user's specified page size value (e.g., page size preference 144).

Such a user interface, (e.g., user interface engine 150) is operable to communicate with other system blocks, which in turn can fetch information from various sources and apply filtering, merging, and pagination operations, and can deliver information to the user interface for display in accordance with user preferences.

Strictly as an example, a user interface can communicate with an N-way paginated merge engine 120, which in turn controls a query processor engine (e.g., source engine 130). The N-way paginated merge engine 120 can fetch information from various sources (see fetch unit $134_1$, fetch unit $134_2$, fetch unit $134_3$); apply filtering (see data filter $132_1$, data filter $132_2$, data filter $132_3$), and perform merging and pagination operations (see merge-sort engine 136, merge local storage $138_1$, merge local storage $138_2$, merge local storage $138_3$) prior to delivery of the fetched information to the user interface for display. The display characteristics can be user-dependent or otherwise in accordance with the user preferences.

The fetch operation uses any known techniques to specify the characteristics of the information to be fetched, for example, a query. Such a query can include characteristics of the extent of the requested retrieval, for example, a starting record indicator (e.g., see NextStartIndicator $122_1$, NextStartIndicator $122_2$, NextStartIndicator $122_3$), and a fetch range (e.g., see FetchRange $129_1$, FetchRange $129_2$, FetchRange $129_3$). The source engine 130 can receive any one or more forms of fetch instructions (e.g., one or more queries) and can process the queries across one or more sources (e.g., source $112_1$, source $112_2$, source $112_3$, etc.). In some embodiments queries can be processed concurrently and any of the information from one or more retrievals can be cached within the source engine 130.

As previously mentioned, disclosed herein are algorithms to achieve pagination with filtering and sorting across multiple sources in a seamless manner. One such algorithm can be performed within the environment 100 using the shown system blocks. The N-way paginated merge engine stores sufficient state variables so as to manage sparse retrievals based on commands from a user operating a paginated view. Using such sparse retrievals, the various sources are queried so they contribute only a selected portion of their information. More specifically, the one or more sources are queried so as to retrieve only the extent needed to fulfill the information needs of a particular paginated view (e.g., based on a next page request, or based on a previous page request, etc.). In exemplary cases, aspects of current/previous states are stored, which states represents at least the extent of the most recent retrieval. Having such state information for each participating source facilitates techniques to retrieve a next portion of information from each corresponding source, and access or retrieval of a next portion can be deferred until a user makes a request for more information that would require additional information retrieval from a particular source.

In a specific case, the state stored from each source comprises a stored starting point (e.g., a NextStartIndicator $122_1$, NextStartIndicator $122_2$, NextStartIndicator $122_3$) corresponding to the data to be fetched upon a next page command, the starting index of subset of data that needs to be fetched upon a previous page command (e.g., a PrevStartIndicator $124_1$, PrevStartIndicator $124_2$, PrevStartIndicator $124_3$), an indication of the number of or extent of elements consumed in the most recent fetch (e.g., ElementsConsumed $128_1$, ElementsConsumed $128_2$, ElementsConsumed $128_3$), and an indication (e.g., PrevStartType $126_1$, PrevStartType $126_2$, PrevStartType $126_3$) of the interpretation of a corresponding previous start indicator (e.g., to be interpreted as a range or as an index), and so on. As shown, a source can report a total count of data items in response to a query (e.g., see TotalCount=5 associated with source $112_1$, TotalCount=1 associated with source $112_2$, TotalCount=6 associated with source $112_3$).

Figure 2:
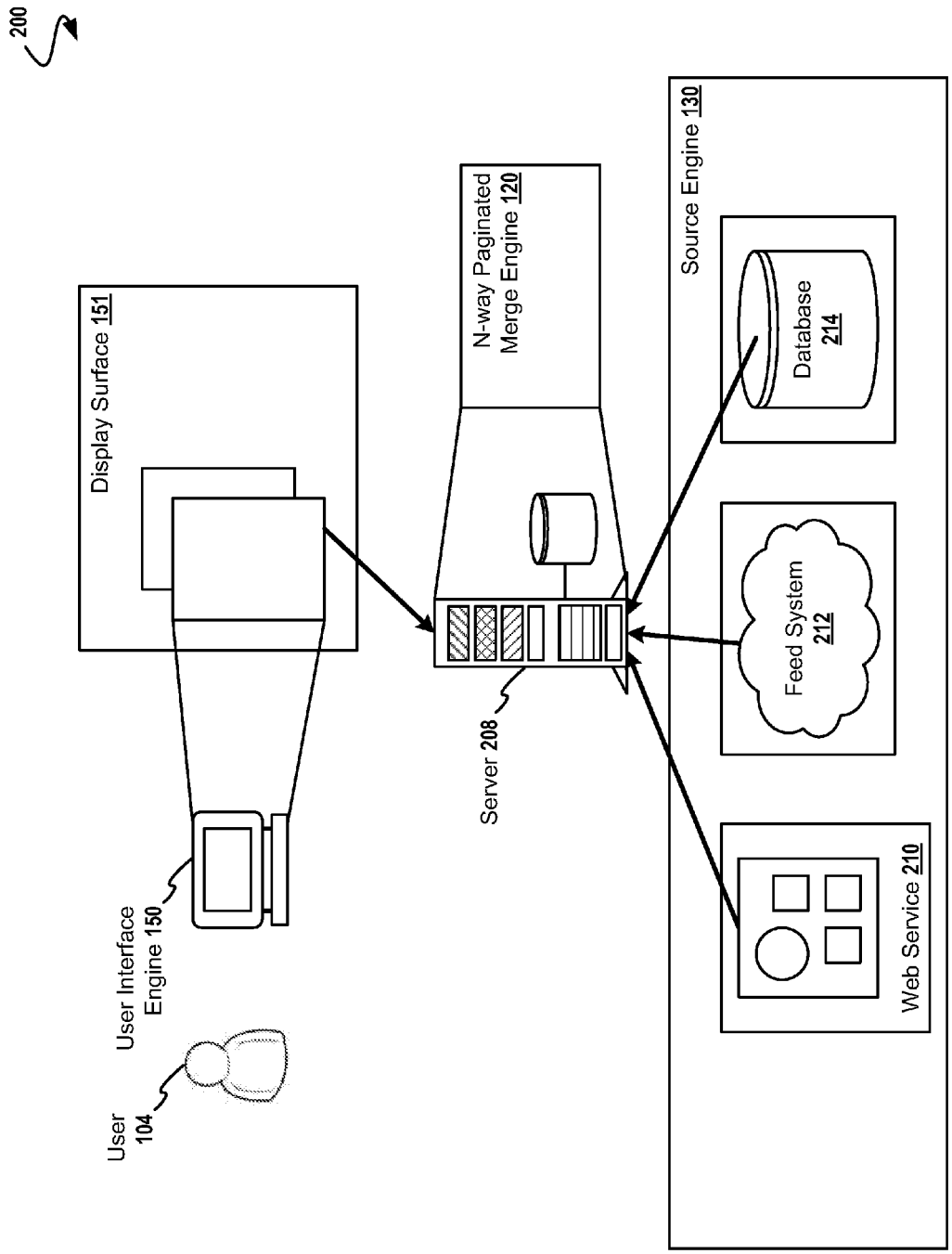
FIG. 2 is a diagram of an environment for high-performance rendering of displays using N-way paginated merging of information from diverse sources, according to some embodiments.

[FIG. 2 is a diagram of environment 200 for high-performance rendering of displays using N-way paginated merging of information from diverse sources. As an option, the present environment 200 may be implemented in the context of the architecture and functionality of the embodiments described herein. Of course, however, the environment 200 or any operation therein may be carried out in any desired environment.

Techniques for rendering of displays using N-way paginated merging of information are conveniently implemented within a client-server network where a user 104 operates a client device (e.g., comprising a user interface engine 150), which in turn displays buttons (e.g., first page button 152, last page button 154, previous page button 156, next page button 158, etc.) for user input (e.g., using a display surface 151). The user interface engine is responsive to user gestures to the extent that user commands are sent to a server 208, which (as shown) implements an N-way paginated merge engine 120. The N-way paginated merge engine 120, in cooperation with a source engine 130 (or any other execution module within server 208) can retrieve information from a variety of sources, for example from a web service 210, from a database 214, or from a feed system 212, which feed system is configured to provide real-time and/or streaming information upon access.

Within the environment of FIG. 2, any one or more techniques for N-way paginated merging of information from diverse sources can be practiced. In particular, any of the computing modules of the devices shown in environment 200 can implement portions of a page population procedure, as is now briefly described.

Figure 3:
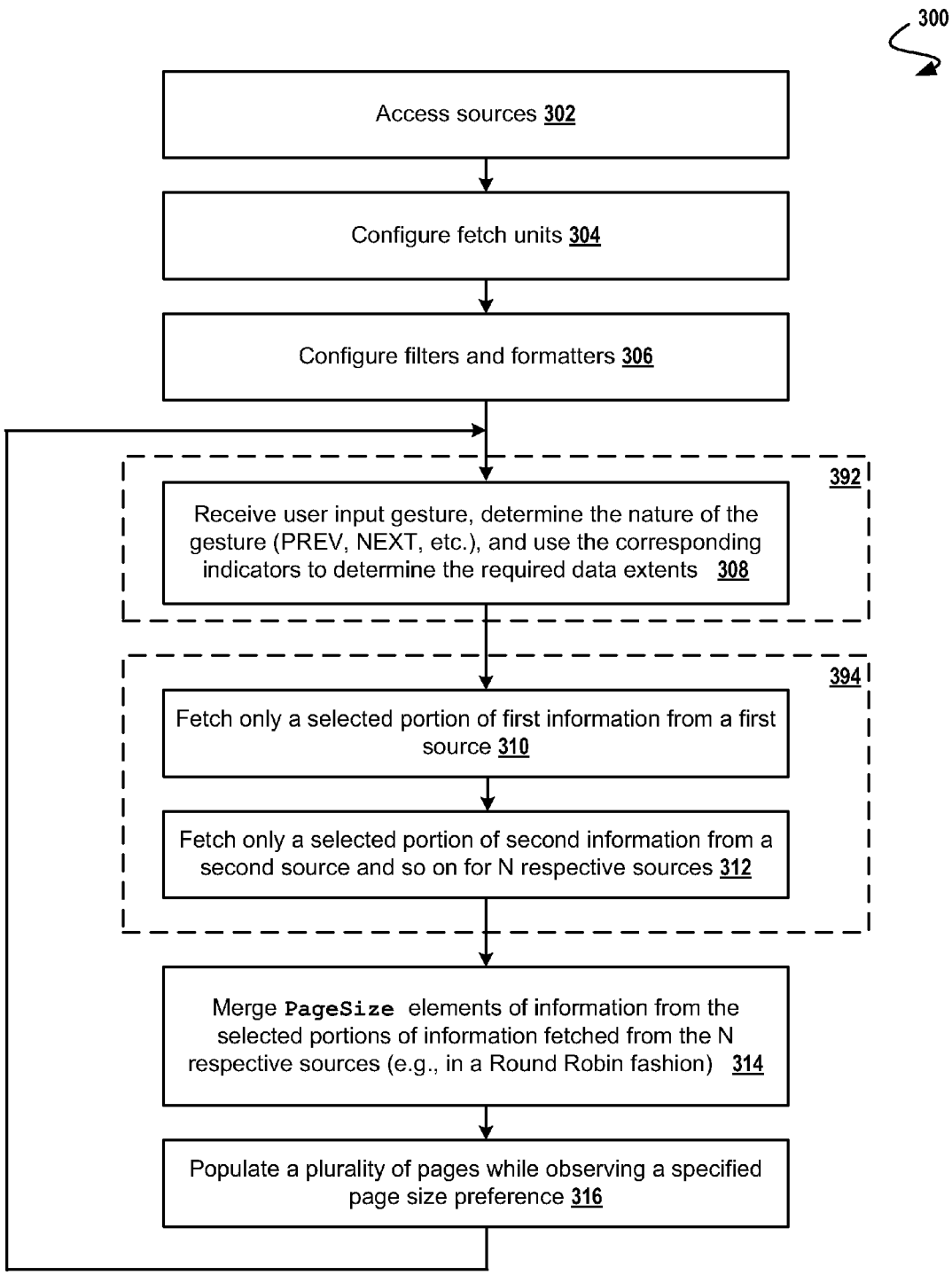
FIG. 3 is a flow chart of a page population procedure for high-performance rendering of displays using N-way paginated merging of information from diverse sources, according to some embodiments.

FIG. 3 is a flow chart of a page population procedure 300 for high-performance rendering of displays using N-way paginated merging of information from diverse sources. As an option, the present page population procedure 300 may be implemented in the context of the architecture and functionality of the embodiments described herein. Of course, however, the page population procedure 300 or any operation therein may be carried out in any desired environment.

As shown in FIG. 3, the algorithm commences by accessing sources (see operation 302). Such an access can include determination of the aspects of the information content (e.g., including syntax and semantics) that can be used to configure fetch units (see operation 304) and that can be used to configure filters and formatter units (see operation 306). Then page population procedure 300 continues to next steps, namely to receive user input (see operation 308), which user input comprises one or more user commands such as next page, previous page, etc. The user input can be classified in another step and different operations performed based on the classification of the user input. Such classification and branching can be amalgamated into operation 392. As shown and described herein (e.g., see 392 of FIG. 3, and see 392 of FIG. 4), the operation 392 can receive a user input gesture, determine the nature of the gesture (PREV, NEXT, etc.), and use the corresponding indicators to determine the required data extents.

Having received user input, and having classified a user gesture, an operation to perform fetches (see operation 394) serves to fetch only a selected portion of information from a first source (see operation 310), and then to fetch only a selected portion of other information from a second source (see operation 312) and so on from all N sources. Embodiments perform merging of the information from all of the N Sources in a "Round Robin" fashion. For example, if the user had requested PageSize elements per page, and to be sorted in ascending order, then steps in operation 394 serve to compare the first element of the first source with the first element of the second source and select the smallest element; and then compare it with the first element of the third source and then select the smallest element among them; and so on, repeating this for all the N sources until the first smallest element is identified. Once the smallest element has been identified, then add it to a result set and increment the indices of the corresponding source. Certain indices will keep track of how many elements got consumed from that source. The value of how many elements got consumed from that source is used in various state tracking. For example, the value of how many elements got consumed from a respective source is used in the assignment of the ElementsConsumed variable (see description and calculations of FIG. 4). The foregoing is repeated until the user-requested PageSize elements have been processed.

Returning to FIG. 1, and further describing the above operations, the fetch units serve for retrieving data items in accordance with a user preference for page size, for example a page size of (at most) four data items from each source shown (i.e., source $112_1$, source $112_2$, source $112_3$). Such a fetch would result in a set of data items comprising {A, B, P, Q, C, D, E, S, T}. Then in accordance with a user preference for page size of four data items, a page (e.g., page $140_1$) can be populated in a sorted fashion comprising data items {A, B, C, D}, as shown. In this embodiment, the merging of data from each source shown (i.e., source $112_1$, source $112_2$, source $112_3$) is done by accessing the respective sources in Round Robin fashion as described in the above paragraphs.

In the event that the user indicates a further command (e.g., using the next page button), the procedure (e.g., operation 394) would again fetch only a selected portion of information from each source (i.e., source $112_1$, source $112_2$, source $112_3$), which fetch operation would result in a set of data items comprising {P, Q, R, E, S, T, U}, and then perform merging while observing a specified page size preference, and possibly using any previously retrieved (but unused) information. Such a sequence of operations would result in data set {E, P, Q, R} (see operation 314 for N sources and see page $140_2$). The last step of page population procedure 300 covers the actual page population step where operation 316 serves to populate pages while observing a specified page size preference.

Figure 4:
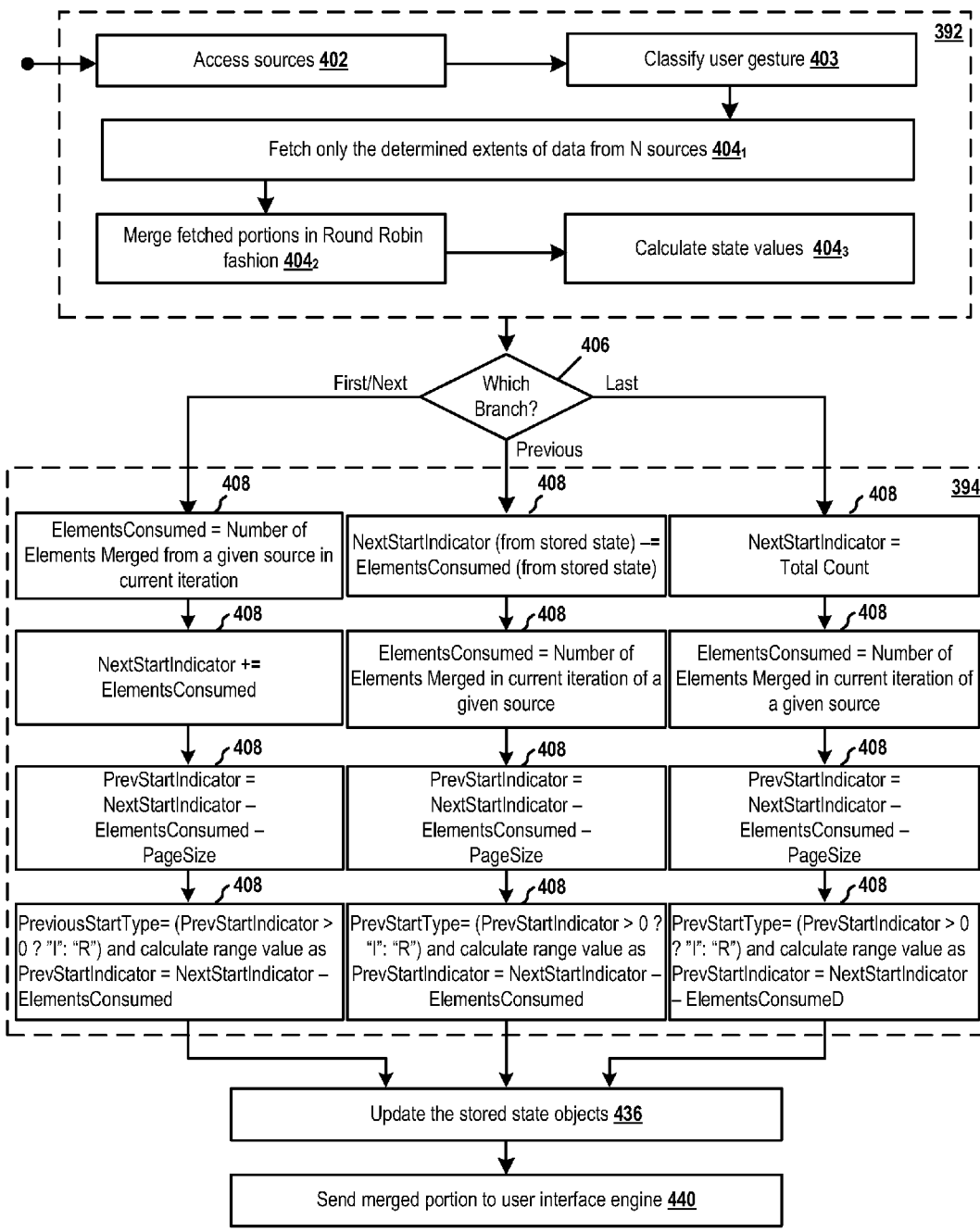
FIG. 4 is a flow chart of a state transition procedure for high-performance rendering of displays using N-way paginated merging of information from diverse sources, according to some embodiments.

FIG. 4 is a flow chart of a state transition procedure 400 for high-performance rendering of displays using N-way paginated merging of information from diverse sources. As an option, the present state transition procedure 400 may be implemented in the context of the architecture and functionality of the embodiments described herein. Of course, however, the state transition procedure 400 or any operation therein may be carried out in any desired environment.

The operation of the flow of FIG. 4 can be elucidated as follows: When the user makes a first request, access the sources (see operation 402) and fetch data from multiple sources (e.g., from a database using a query, using a web service call, etc.) based on the nature of the user request, which may be determined at least in part by classifying a user gesture (see operation 403), then fetch from the sources only the determined extents (see operation $404_1$), merge fetched portions (see operation $404_2$), and calculate state values (see operation $404_3$). Then, based on the user request, one or another branch is taken (see decision 406), and the aforementioned stored states 408 are used and/or updated in the respective branch (see branches within operation 394). The fetched data may be stored in different caches and/or in different formats, and may be accessed in serial fashion or in parallel fashion. In this embodiment, the first user request precipitates the allocation of a state object. In some cases such a state object can be stored in an HTTP session and is updated for subsequent requests. The state object can be updated during progression through the branch, or can be updated in an atomic operation (see operation 436). Each source may have a respective state object comprised of any/all of the stored states 408 including any/all of the:

NextStartIndicator: Starting index or other indicator of subset of data that needs to be fetched when the user clicks on next button.

PrevStartIndicator: Starting index or other indicator of subset of data that needs to be fetched when the user clicks on previous/back button.

ElementsConsumed: Number of elements contributed for displaying current page to user in the current iteration.

A two state value, PreviousStartType: To indicate if PrevStartIndicator is to be used as a range (value of "R") or as an index (value of "I").

First and Next Commands

Continuing, when the page is displayed (e.g., loaded for the first time) or when the user clicks on the next or the first button (see FIRST and NEXT buttons in FIG. 1), then data is fetched from each source starting from that source's respective NextStartIndicator to NextStartIndicator+PageSize data items, and the data items are merged/sorted/paginated as requested by user. The merge operation can perform a forward merge of PageSize elements, and arrange the elements in ascending or descending order as per the user's request. For each source, operation 394 updates the stored states 408 as follows.

Step1: ElementsConsumed=Number of elements merged of a given source in the current iteration.

Step2: NextStartIndicator=NextStartIndicator+ElementsConsumed

Step3: PrevStartIndicator=NextStartIndicator−ElementsConsumed−PageSize where the number PageSize is the number of elements as per user preferences.

Step4: PreviousStartType=(PrevStartIndicator>0? "I": "R") and calculate range value as:
PrevStartIndicator=NextStartIndicator−ElementsConsumed This will give valid range value for PrevStartIndicator. Finally store the state (see path $139_0$, path $139_1$, path $139_2$) and send the merged results to user interface engine (see operation 440).

Back and Previous Commands

When the user clicks on a BACK/PREV button, then for each source, if the sense of PrevStartType is an index, then use PrevStartIndicator as an index and fetch data starting from PrevStartIndicator to PrevStartIndicator+PageSize. Otherwise use PrevStartIndicator as a range to fetch data starting from 0 to PrevStartIndicator and do reverse merge of only PageSize elements in an ascending or descending order as per user preferences. Update the state as follows for each source:

Step1: First, calculate the NextStartIndicator as follows:
NextStartIndicator=NextStartIndicator−ElementsConsumed. Both the NextStartIndicator and ElementsConsumed values should be from the stored state, (e.g., the values that were stored in a previous request).

Step2: ElementsConsumed=Number of elements merged of a given source in the current iteration.

Step3: PrevStartIndicator=NextStartIndicator−ElementsConsumed−PageSize

Step4: PrevStartType=(PrevStartIndicator>0? "I": "R") and calculate range value as:
PrevStartIndicator=NextStartIndicator−ElementsConsumed (this will give a valid range value for PrevStartIndicator).

Finally store the state and send the merged results to user interface engine (see operation 440).

Last Command

When the user clicks on the LAST button, then from each source, fetch data starting from TotalCount of a given source minus PageSize to TotalCount of a given source, and perform a reverse merge in ascending or descending order as per user request. The number of elements to be merged is calculated as follows:

If (sumof(TotalCount from all the sources) % PageSize==0)

Then merge PageSize elements

Else

Merge (sumof(TotalCount from all the sources) % PageSize) number of elements.

Update the state (see path $139_0$, path $139_1$, path $139_2$) for each source as follows:

Step1: ElementsConsumed=Number of elements merged of a given source in the current iteration.

Step2: NextStartIndicator=TotalCount (of a given source).
Step3: PrevStartIndicator=NextStartIndicator−Elements-Consumed−PageSize.
Step4: PrevStartType=(PrevStartIndicator>0? "I": "R") and calculate range value as:
PrevStartIndicator=NextStartIndicator−ElementsConsumed. This will give valid a range value for PrevStartIndicator.

Finally store the state and send the merged portion to user interface engine (see operation 440).

Figure 5:
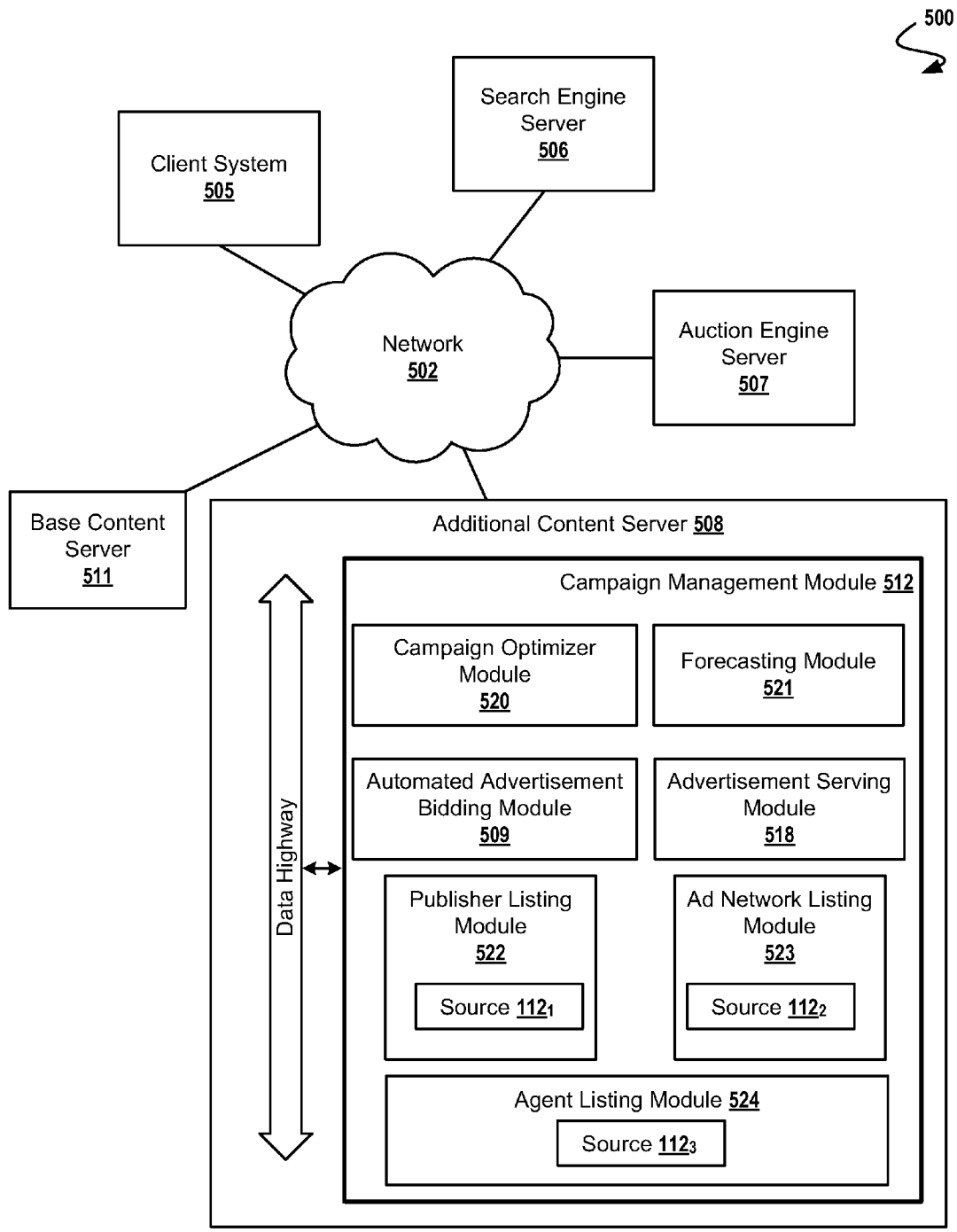
FIG. 5 is a block diagram of an advertising network for high-performance rendering of displays using N-way paginated merging of information from diverse sources, according to some embodiments.

FIG. 5 is a block diagram of an advertising network 500 for high-performance rendering of displays using N-way paginated merging of information from diverse sources. As an option, the present advertising network 500 may be implemented in the context of the architecture and functionality of the embodiments described herein. Of course, however, the advertising network 500 or any operation therein may be carried out in any desired environment.

As shown, FIG. 5 depicts an advertising server network environment including modules for implementing a campaign management module. The advertising server network environment implements a system for delivery of internet advertising. In such an environment, an internet advertiser may select a particular property (e.g., Yahoo.com/Finance, or Yahoo.com/Search), and may generate an advertisement such that whenever any internet user, via a client system 505 renders the web page from the selected property, possibly using a search engine server 506, the advertisement is composited on a web page by one or more servers (e.g., base content server 511, additional content server 508) for delivery to a client system 505 over a network 502. Given this generalized delivery model, and using techniques disclosed herein, sophisticated online advertising might be practiced, and such deliver can be monetized.

Again referring to FIG. 5, an internet property (e.g., a publisher hosting the publisher's base content on a base content server 511) might be able to measure the number of visitors that have any arbitrary characteristic, demographic, target predicates, or attribute, and store such observations at an additional content server 508. Thus, an internet user might be 'known' in quite some detail as pertains to a wide range of target predicates or other attributes. Multiple publishers might host base content into which base content of an advertising impression can be composited, and competing advertisers might elect to bid in a market via an exchange auction engine server 507 in order to win the most prominent spot in an impression. Or, an advertiser might enter into a contract (e.g., with the internet property, or with an advertising agency, or with an advertising network, etc.) to purchase the desired spots for some time duration (e.g., all top spots in all impressions of the web page empirestate.com/hotels for all of 2010). Such an arrangement, and variants as used herein, is termed a contract.

The management of contracts, and more generally, the management of a campaign, can be facilitated using a campaign management module 512. In embodiments of the systems within advertising network 500, components of the additional content server perform processing such that, given a desire to form an advertising campaign, a variety of modules serve management and control operations (e.g., a campaign optimizer module 520, a forecasting module 521, an advertisement serving module 518, an automated advertisement bidding module 509, a publisher listing module 522, an ad network listing module 523, an agent listing module 524, a network linking module etc.), and any of the aforementioned modules may host one or more sources (e.g., source $112_1$, source $112_2$, source $112_3$, etc.) that comprise information pertinent to managing a campaign for serving advertisements to users. In particular the modules, network links, algorithms, assignment techniques, serving policies, and data structures embodied within the advertising network 500 might be specialized so as to perform a particular function or group of functions reliably while observing capacity and performance requirements. For example, an additional content server 508 might be used to implement a forecast management system employing any number of displays using N-way paginated merge of information from diverse sources.

More specifically, a campaign management module might need to display a large number of data items to a user. A user might need to see a large number of ad networks, a large number of publishers, a large number of agents, and a large number of bids destined for an exchange. Following the techniques herein-disclosed, a campaign management module might need to display a large number of data items to a user based on user preferences for pagination and sorting, and filtering and formatting.

As a context-specific example of using a computer implemented method for high-performance rendering of a multi-page display using paginated merging of information from a plurality of N information sources, a use model might comprise:
identifying a first information source (e.g., information from a publisher listing module 522) from the plurality of N information sources,
identifying a second information source (e.g., information from an ad network listing module 523) from the plurality of N information sources and so on for all the N sources, then;
receiving a first user input from a user interface device (e.g., client system 505).

A component within the campaign management module 512 then serves to:
retrieve a first set of data items from the first information source after determining a first extent of information retrieval from the first information source, and further;
retrieve a second set of data items from the second information source after determining a second extent of information retrieval, and so on for all N sources Then, after the retrievals of the small extents of data items, a campaign management module can employ an N-way paginated merge engine 120 to perform:
Merging: Data fetched from all of the N sources will be merged in Round Robin fashion until PageSize elements are merged.
Displaying: Rendering the sorted set of data items on a display surface for the user to review, and possibly issuing additional commands such a next page, last page, etc.

In exemplary cases, determining the first extent of information retrieval is calculated based on saved values from a previously-determined first extent so as to limit the fetch-to-retrieve only as many data items as might be needed to populate a display page. The data items display might be filtered based on one or more criteria just after retrieval (see fetch units and see data filters of FIG. 1). The one or more criteria might comprise criteria that relates to the first set of data items to the second set of data items (e.g., a join operation). The data items displayed might be formatted before display operations, or possibly might be formatted before merging operations. For example, one technique comprises formatting data items just after retrieval (see fetch units and see data filters of FIG. 1). Another technique comprises formatting data items during a merge-sort operation (see merge-sort engine 136).

Figure 6:
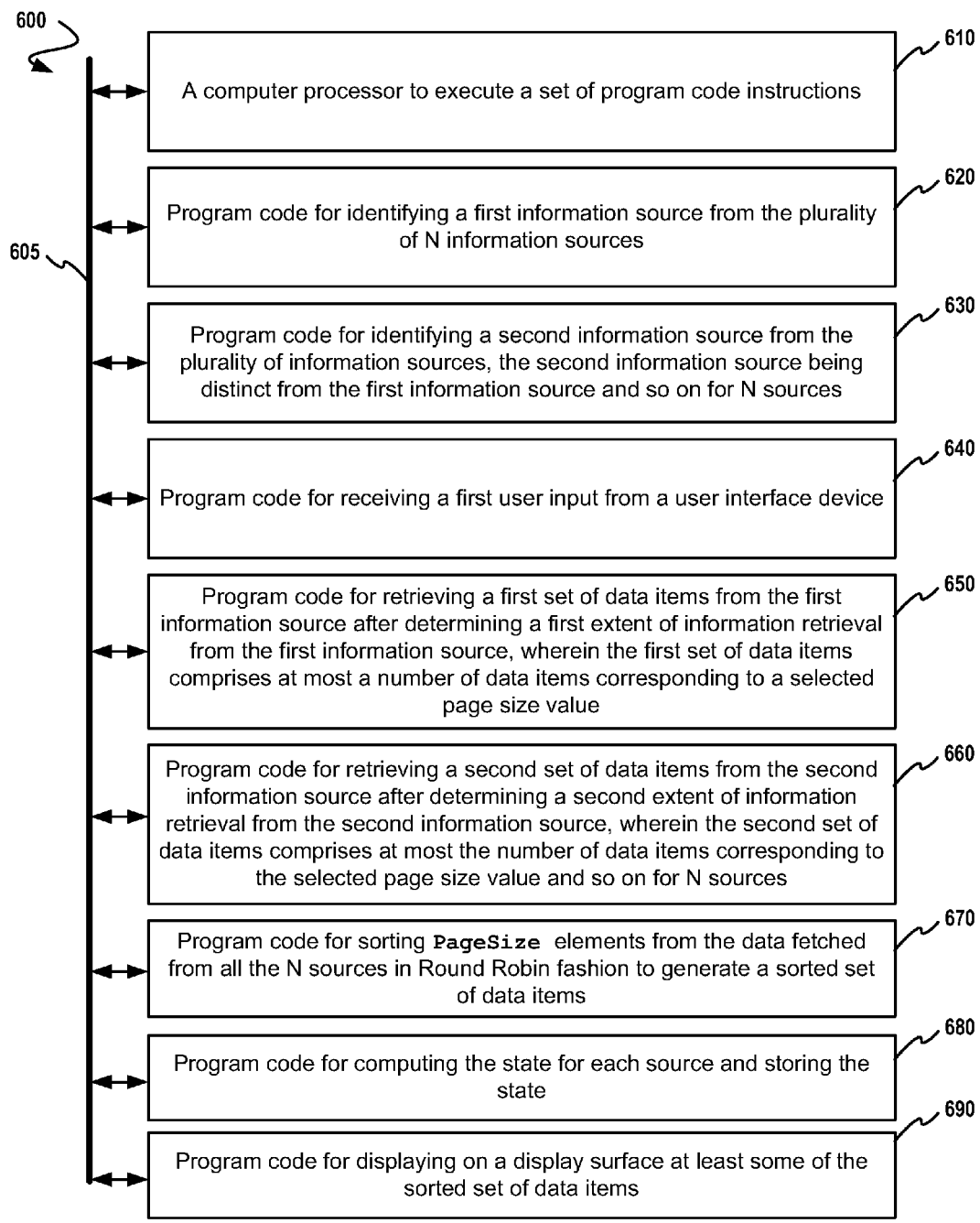
FIG. 6 is a schematic of a system for high-performance rendering of displays using N-way paginated merging of information from diverse sources, according to some embodiments.

FIG. 6 is a schematic of a system for high-performance rendering of displays using N-way paginated merging of information from diverse sources. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: identifying a first information source from the plurality of N information sources (see module 620); identifying a second information source from the plurality of information sources, the second information source being distinct from the first information source (see module 630) and so on from all the N sources; receiving a first user input from a user interface device (see module 640); retrieving a first set of data items from the first information source after determining a first extent of information retrieval from the first information source, wherein the first set of data items comprises at most a number of data items corresponding to a selected page size value (see module 650); retrieving a second set of data items from the second information source after determining a second extent of information retrieval from the second information source, wherein the second set of data items comprises at most the number of data items corresponding to the selected page size value (see module 660) and so on from all the N sources; sorting PageSize elements from the data fetched from all of the N sources in Round Robin fashion to generate a sorted set of data items (see module 670); computing the state for each source and storing the state (see module 680); and displaying on a display surface at least some of the sorted set of data items (see module 690).

Section III

Exemplary Practice of Embodiments

Figure 7:
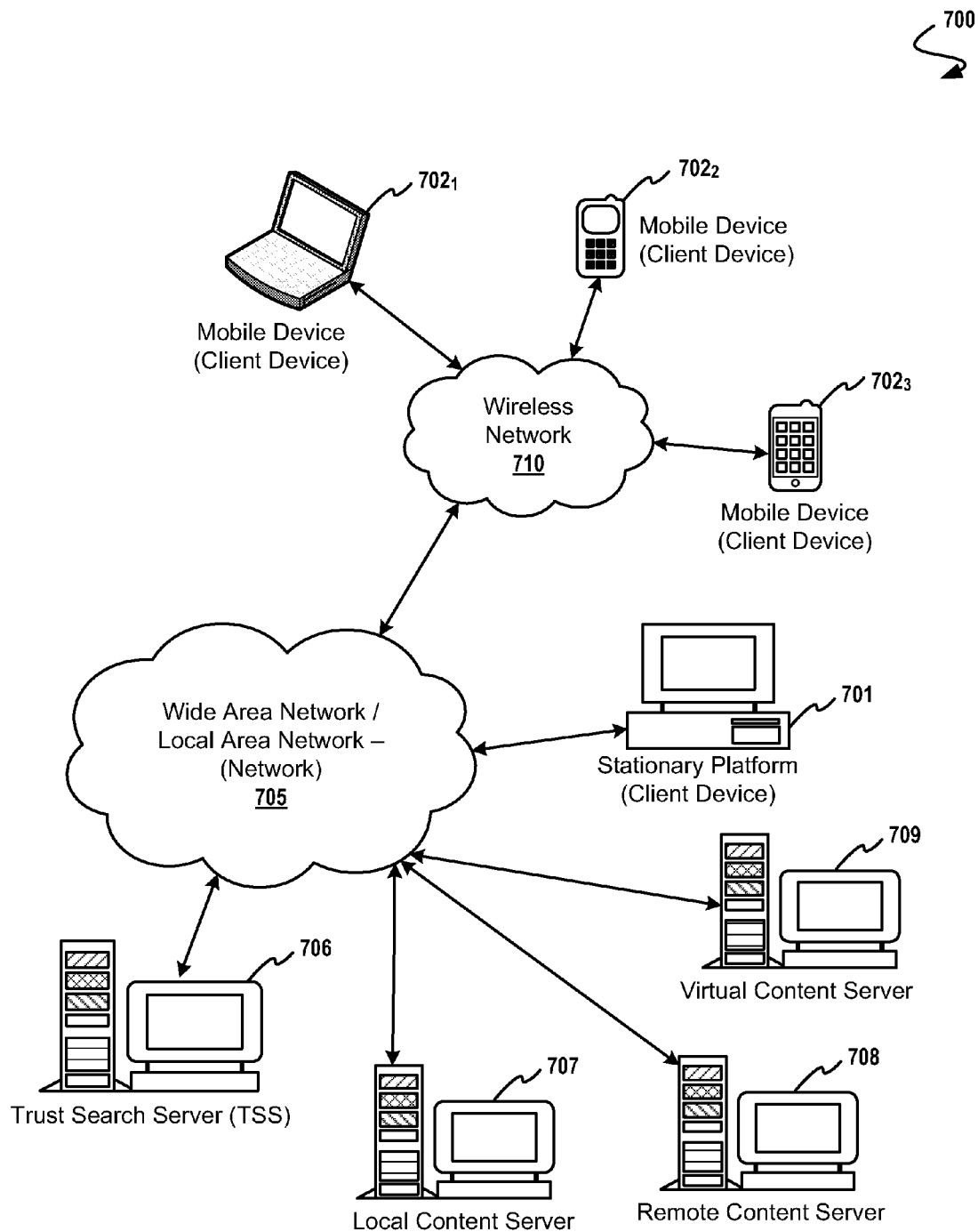
FIG. 7 is a schematic diagram illustrating an example embodiment of an advertising network.

FIG. 7 is a schematic diagram 700 illustrating an example embodiment of an advertising network. Other embodiments that may vary, for example, in terms of arrangement or in terms of type of components, are also intended to be included within the claimed subject matter. As shown, FIG. 7 for example, includes a variety of networks such as a wide area network (WAN)/local area local area network (LAN) 705 and a wireless network 710; a variety of devices such as client devices (in the forms of a stationary platform 701, a first mobile device 702$_1$, a second mobile device 702$_2$, and another mobile device 702$_3$); and a variety of servers such as a local content server 707, a remote content server 708, a virtual content server 709, and such as a search server 706.

Figure 8:
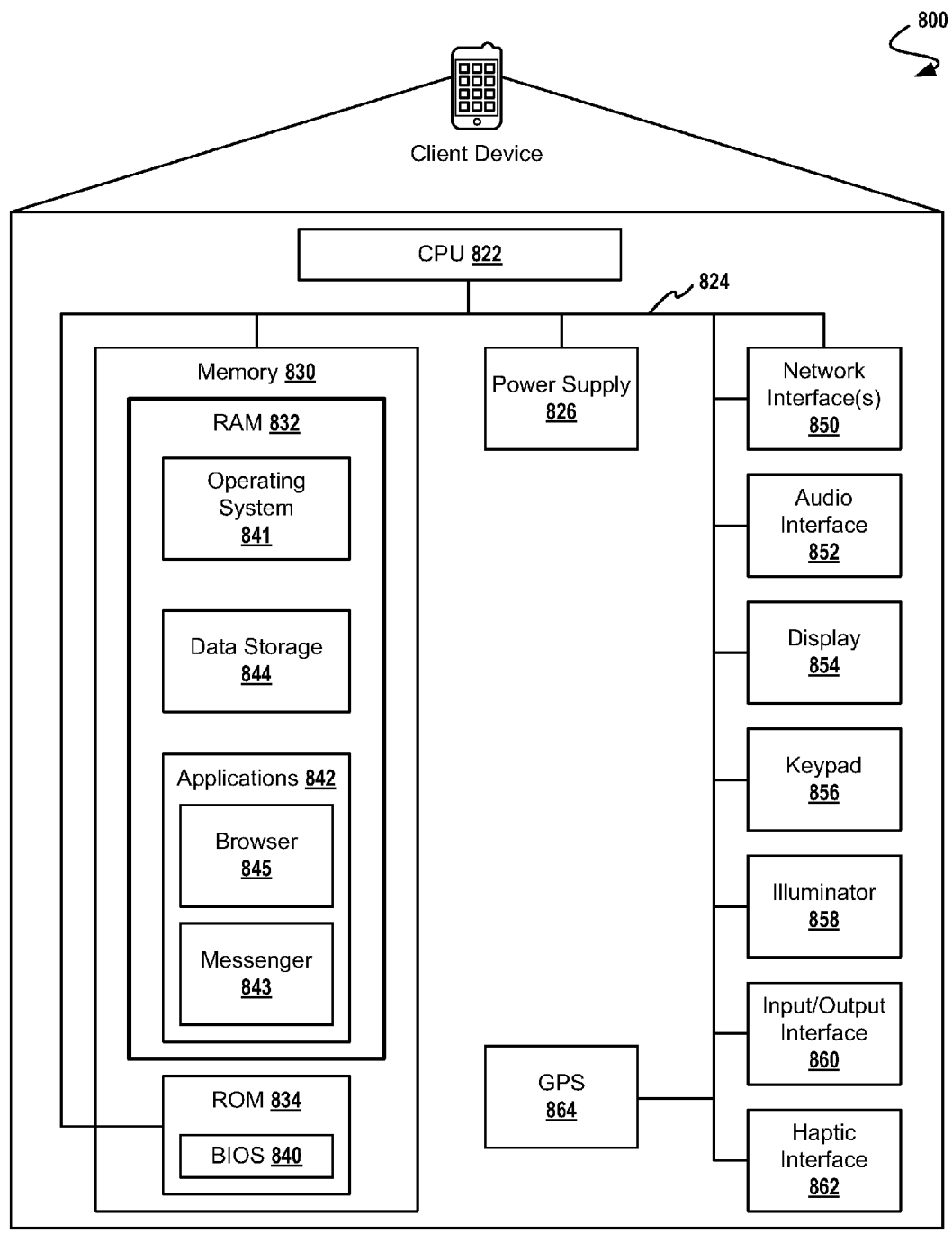
FIG. 8 is a schematic diagram illustrating an example embodiment of a client device.

FIG. 8 is a schematic diagram illustrating an example embodiment of a client device. A client device 800 may include a computing device capable of sending or receiving signals such as via a wired or a wireless network. A client device may, for example, include a desktop computer or a portable device such as a cellular telephone, a smartphone, a display pager, a radio frequency (RF) device, an infrared (IR) device, a personal digital assistant (PDA), a handheld computer, a tablet computer, a laptop computer, a set top box, a wearable computer, an integrated device combining various features such as features of the forgoing devices, or the like.

A client device may vary in terms of capabilities or features. Claimed subject matter is intended to cover a wide range of potential variations. For example, a cell phone may include a numeric or other instance of a keypad 856 or a display 854 of limited functionality such as a monochrome liquid crystal display (LCD) for displaying text and symbols. In contrast, however, as another example, a web-enabled client device may include one or more physical or virtual keyboards, mass storage, one or more accelerometers, one or more gyroscopes, a global positioning system (e.g., GPS 864), or other location-identifying type capability, or a display with a high degree of functionality such as a touch-sensitive color 2D or 3D display, possibly with backlighting or other illuminator 858, or a haptic interface 862, or another variety of input/output interface 860, for example.

A client device may include memory 830, possibly with a section of RAM 832 or other memory (e.g., data storage 844) or forms of non-volatile memory (e.g., ROM 834) that can be accessed by a processor (e.g., a CPU 822) and which may execute a variety of basic I/O functions (e.g., BIOS 840) and/or may execute a variety of operating systems 841, including a personal computer operating system such as a Windows, iOS or Linux, or a mobile operating system such as iOS, Android, or Windows Mobile, or the like. A client device may include or may execute a variety of possible applications 842 such as a client software application enabling communication with other devices such as communicating one or more messages using a messenger application 843, or such as via email, short message service (SMS), or multimedia message service (MMS), including via a network such as a social network, including, for example, Facebook, LinkedIn, Twitter, Flickr, or Google+, to provide only a few possible examples. A client device may also include or execute an application to communicate content such as, for example, textual content, multimedia content, or the like. A client device may also include or execute an application to perform a variety of possible tasks such as browsing using a browser 845, searching, playing various forms of content, including locally stored or streamed video, audio (e.g., using audio interface 852) or games (such as fantasy sports leagues), possibly including networked games or other applications using one or more instances of network interface 850. Any of the foregoing functional blocks comprising the client device 800 can be powered by one or more instances of a power supply 826, and any of the foregoing functional blocks comprising the client device 800 can communicate with any other of the foregoing functional blocks over a communication bus 824. The foregoing is provided to illustrate that claimed subject matter is intended to include a wide range of possible features or capabilities.

Figure 9:
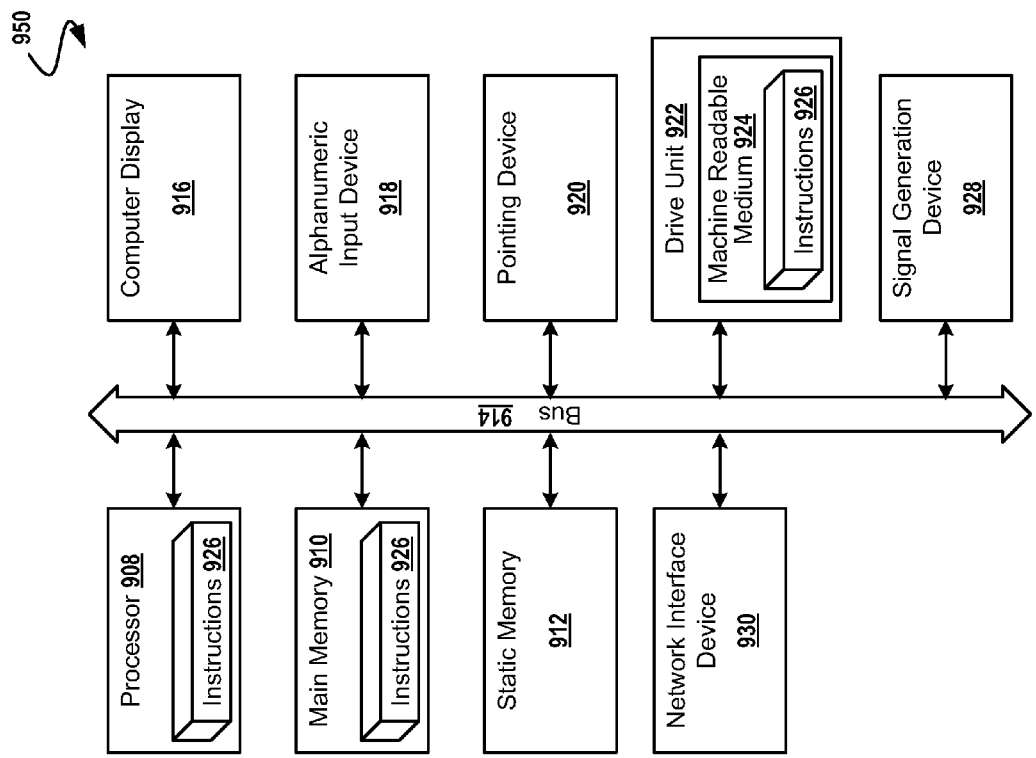
FIG. 9 is a block diagram a computer system for implementing high-performance rendering of displays using N-way paginated merging of information from diverse sources, according to some embodiments.
Figure 9:
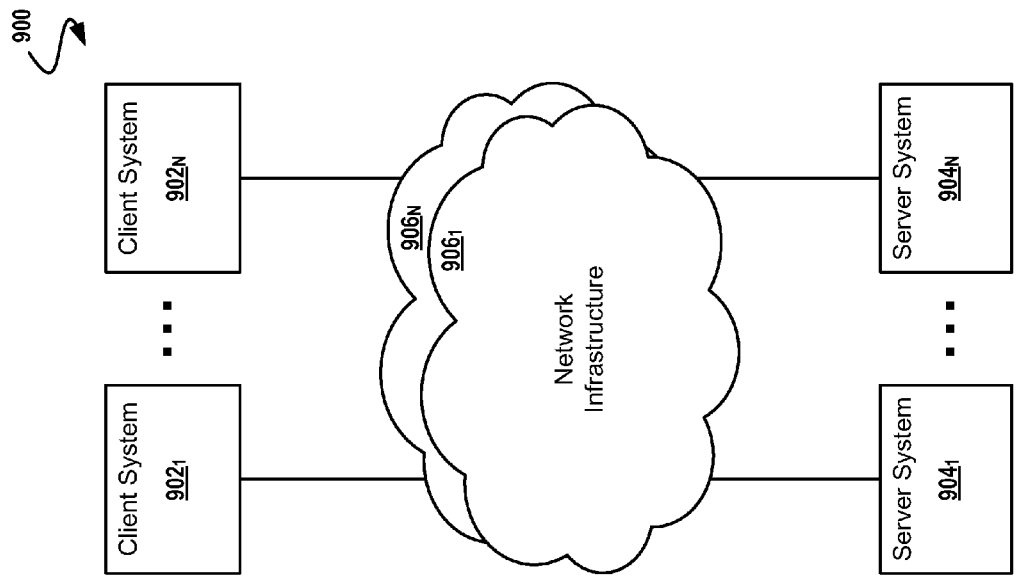

FIG. 9 is a block diagram 900 of a computer system for implementing embodiments for high-performance rendering of displays using N-way paginated merging of information from diverse sources. In one context, The computer system includes nodes for client computer systems (e.g., client system $902_1$ through client system $902_N$), nodes for server computer systems (e.g., server system $904_1$ through server system $904_N$), and nodes for network infrastructure (e.g., network infrastructure $906_1$ through network infrastructure $906_N$), any of which nodes may comprise a machine (e.g., computer 950) within which a set of instructions for causing the machine to perform any one of the techniques discussed above may be executed. The embodiment shown is purely exemplary, and might be implemented in the context of one or more of the figures herein.

Any node of the network may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems (including a processor and memory), a massively parallel computer system, and/or a cloud computer system.

The computer system (e.g., computer 950) includes a processor 908 (e.g., a processor core, a microprocessor, a computing device, etc.), a computer memory (e.g., main memory 910), and/or a static memory 912, which communicate with each other via a system bus 914. The computer 950 may further include a display unit (e.g., computer display 916) that may comprise a touch screen, or a liquid crystal display (LCD), or a light emitting diode (LED) display, or a cathode ray tube (CRT). As shown, the computer system also includes a human input/output (I/O) device 918 (e.g., a keyboard, an alphanumeric keypad, etc.), a pointing device 920 (e.g., a mouse, a touch screen, etc.), a drive unit 922 (e.g., a disk drive unit, a CD/DVD drive, a tangible computer readable removable media drive, an SSD storage device, etc.), a signal generation device 928 (e.g., a speaker, an audio output, etc.), and a network interface device 930 (e.g., an Ethernet interface, a wired network interface, a wireless network interface, a propagated signal interface, etc.).

The drive unit 922 includes a machine-readable medium 924 on which is stored a set of instructions (e.g., software, firmware, middleware, etc.) 926 embodying any one, or all, of the methodologies described above. The set of instructions 926 is also shown to reside, completely or at least partially, within the main memory and/or within the processor 908. The set of instructions 926 may further be transmitted or received via the network interface device 930 over the system bus 914.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing non-transitory information in a form readable by a machine (e.g., a computer). For example, a machine-readable medium includes read-only memory (ROM); random access memory (RAM); magnetic disk storage media; optical storage media; flash memory devices; and electrical, optical or acoustical or any other type of media suitable for storing non-transitory information.

While the figures and description have been described with reference to numerous specific details, one of ordinary skill in the art will recognize that the claimed embodiments can be differently embodied in other specific forms without departing from the scope of the claims.

We claim:

1. A computer implemented method for high-performance rendering of displays using N-way paginated merging of information from a plurality of N information sources, the method comprising:
    identifying a first information source from the plurality of N information sources;
    identifying a second information source from the plurality of N information sources, the second information source being distinct from the first information source;
    receiving a first user input including a user command or a user gesture, from a user interface device;
    retrieving a first set of data items from the first information source after determining a first extent of information retrieval from the first information source, wherein the first set of data items comprises at most a number of data items corresponding to a user selected page size value;
    retrieving a second set of data items from the second information source after determining a second extent of information retrieval from the second information source, wherein the second set of data items comprises at most the number of data items corresponding to the user selected page size value; and
    merging the first set of data items and the second set of data items to generate a sorted set of data items based at least on a user-requested sorting style from the first user input, wherein the merging includes performing one or more comparisons between data items from the first set of data items and data items from the second set of data items based at least on the user-requested sorting style, and adding data items to the sorted set of data items in an order based on the one or more comparisons.

2. The method of claim 1, wherein determining the first extent of information retrieval is calculated based at least partially on saved values from a previously-determined first extent.

3. The method of claim 2, wherein the saved values from a previously-determined first extent comprise at least a number of data items retrieved.

4. The method of claim 2, wherein the saved values from a previously-determined first extent comprise at least a count of data items representing a total count of data items reported by the first source.

5. The method of claim 1, further comprising storing the first extent of information retrieval from the first information source and storing the second extent of information retrieval from the second information source.

6. The method of claim 1, further comprising merging the first set of data items and merging the second set of data items in a Round Robin fashion.

7. The method of claim 1, further comprising displaying the first set of data items and displaying the second set of data items.

8. A computer system for high-performance rendering of a multi-page display using paginated merging of information from a plurality of N information sources, comprising:
   a computer processor to execute a set of program code instructions; and
   a memory to hold the program code instructions, in which the program code instructions comprises program code to perform,
   identifying a first information source from the plurality of N information sources;
   identifying a second information source from the plurality of N information sources, the second information source being distinct from the first information source;
   receiving a first user input including a user command or a user gesture, from a user interface device;
   retrieving a first set of data items from the first information source after determining a first extent of information retrieval from the first information source, wherein the first set of data items comprises at most a number of data items corresponding to a user selected page size value;
   retrieving a second set of data items from the second information source after determining a second extent of information retrieval from the second information source, wherein the second set of data items comprises at most the number of data items corresponding to the user selected page size value; and
   merging the first set of data items and the second set of data items to generate a sorted set of data items based at least on a user-requested sorting style from the first user input, wherein the merging includes performing one or more comparisons between data items from the first set of data items and data items from the second set of data items based at least on the user-requested sorting style, and adding data items to the sorted set of data items in an order based on the one or more comparisons.

9. The computer system of claim 8, wherein determining the first extent of information retrieval is calculated based at least partially on saved values from a previously-determined first extent.

10. The computer system of claim 9, wherein the saved values from a previously-determined first extent comprise at least a number of data items retrieved.

11. The computer system of claim 9, wherein the saved values from a previously-determined first extent comprise at least a count of data items representing a total count of data items reported by the first source.

12. The computer system of claim 8, further comprising storing the first extent of information retrieval from the first information source and storing the second extent of information retrieval from the second information source.

13. The computer system of claim 8, further comprising merging the first set of data items and merging the second set of data items in a Round Robin fashion.

14. The computer system of claim 8, further comprising displaying the first set of data items and displaying the second set of data items.

15. A non-transitory computer readable medium, the computer readable medium having stored thereon a sequence of instructions which, when executed by a processor causes the processor to execute a method to implement high-performance rendering of a multi-page display using paginated merging of information from a plurality of N information sources, the method comprising:
   identifying a first information source from the plurality of N information sources;
   identifying a second information source from the plurality of N information sources, the second information source being distinct from the first information source;
   receiving a first user input including a user command or a user gesture, from a user interface device;
   retrieving a first set of data items from the first information source after determining a first extent of information retrieval from the first information source, wherein the first set of data items comprises at most a number of data items corresponding to a user selected page size value;
   retrieving a second set of data items from the second information source after determining a second extent of information retrieval from the second information source, wherein the second set of data items comprises at most the number of data items corresponding to the user selected page size value; and
   merging the first set of data items and the second set of data items to generate a sorted set of data items based at least on a user-requested sorting style from the first user input, wherein the merging includes performing one or more comparisons between data items from the first set of data items and data items from the second set of data items based at least on the user-requested sorting style, and adding data items to the sorted set of data items in an order based on the one or more comparisons.

16. The computer program product of claim 15, wherein determining the first extent of information retrieval is calculated based at least partially on saved values from a previously-determined first extent.

17. The computer program product of claim 16, wherein the saved values from a previously-determined first extent comprise at least a number of data items retrieved.

18. The computer program product of claim 16, wherein the saved values from a previously-determined first extent comprise at least a count of data items representing a total count of data items reported by the first source.

19. The computer program product of claim 15, further comprising merging the first set of data items and merging the second set of data items in a Round Robin fashion.

20. The computer program product of claim 15, further comprising displaying the first set of data items and displaying the second set of data items.

* * * * *